No. 694,452. Patented Mar. 4, 1902.
A. ANDERSON.
WOOD PIPE MACHINE.
(Application filed Aug. 12, 1901.)
(No Model.) 2 Sheets—Sheet 2.
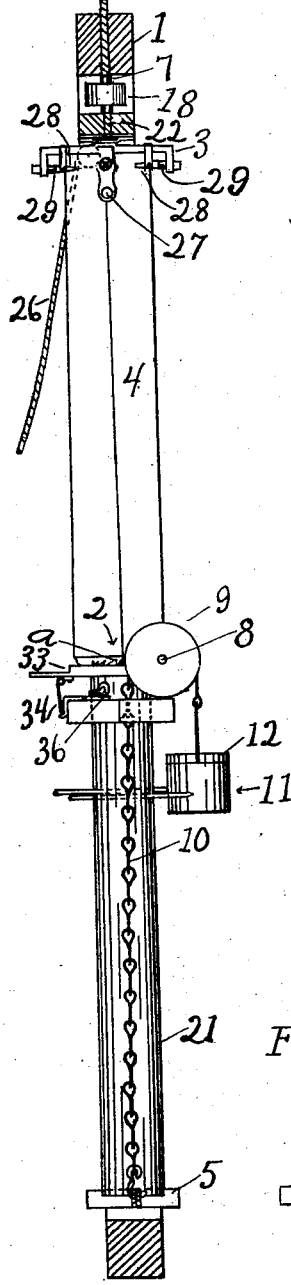
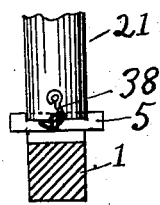
Witnesses.
Albert H. Merrill.
S. Townsend.
Inventor.
Andrew Anderson
by Townsend Bros
his attys

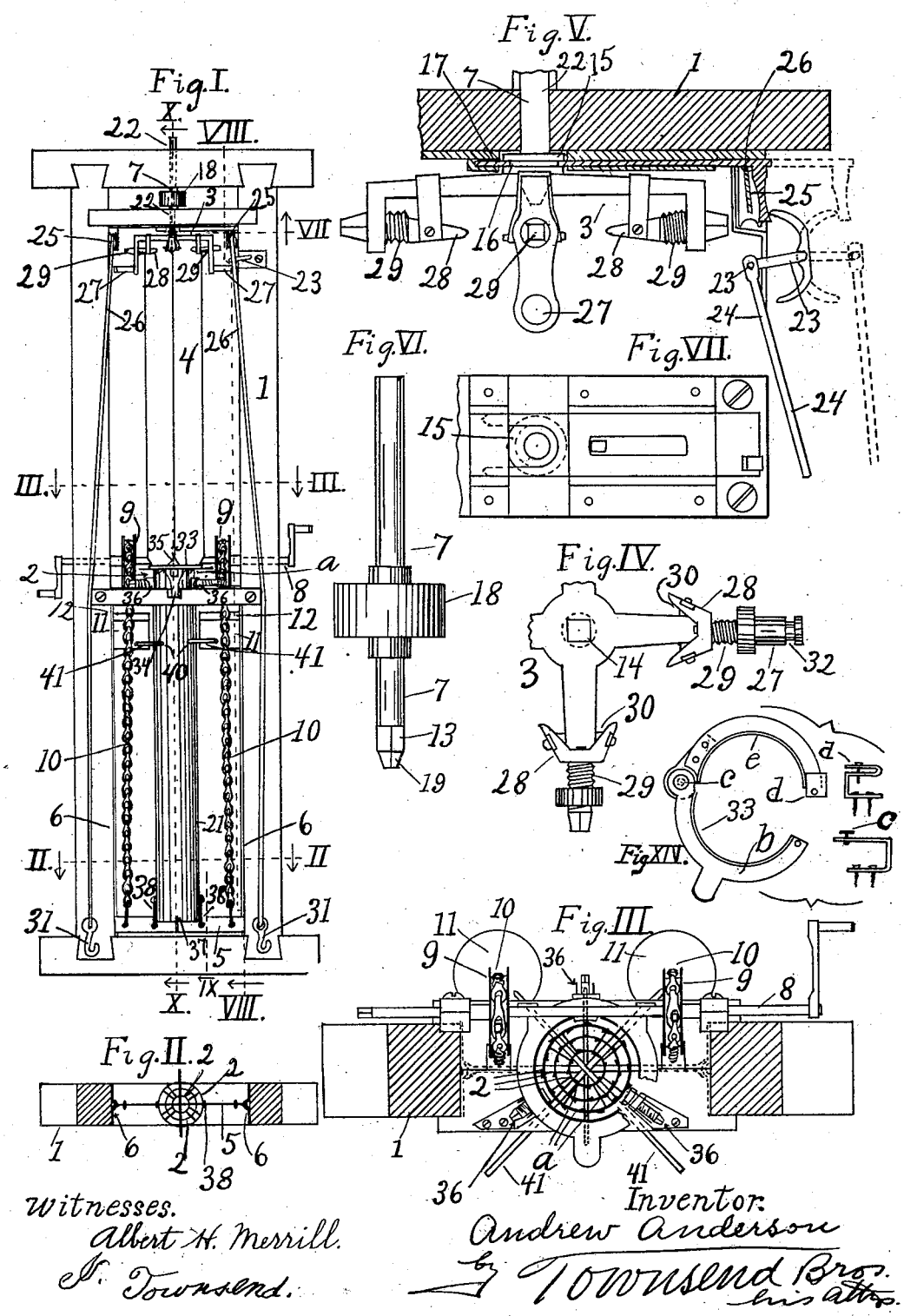

UNITED STATES PATENT OFFICE.

ANDREW ANDERSON, OF BURNETT, CALIFORNIA.

WOOD-PIPE MACHINE.

SPECIFICATION forming part of Letters Patent No. 694,452, dated March 4, 1902.

Application filed August 12, 1901. Serial No. 71,819. (No model.)

*To all whom it may concern:*

Be it known that I, ANDREW ANDERSON, a citizen of the United States, residing at Burnett, in the county of Los Angeles and State of California, have invented a new and useful Wood-Pipe Machine, of which the following is a specification.

The object of this invention is to provide a machine by which a stick of timber can with the greatest ease and facility be cut into thin and strong wooden pipes or tubes of great length.

This invention is adapted for producing from a stick of timber one or more cylinders or tubes with the greatest economy of material, power, and time.

In carrying out my invention I employ an annular cutter comprising one or more annular cutter members, each cutter member being supported by a support, which will follow freely in the annular kerf cut by such cutter member, and open at the bottom to allow the sawdust or chips to pass out by gravity. Preferably the support for the annular cutter member is in the form of a tube. Each cutter member is provided with a series of saw-teeth having an appropriate set, so that when a relative rotation is set up between the stick and tube and the cutter member is in contact with the stick an annular kerf will be cut in the stick, thus producing a cylinder inside and a tube outside said kerf. Preferably a plurality of annular cutter members are employed, and thereby a plurality of tubes simultaneously formed and the entire stick of timber at once reduced to the desired manufacture. The cutter-teeth may be detachable after the manner of detachable saw-teeth. Such construction will be most desirable in cutters of large diameter, but is readily understood without illustration, and therefore the detachable teeth are not shown in the accompanying drawings.

While in relation to some of the features of this invention it is immaterial whether it is the stick or the tube which is rotated or whether it is the tube or the stick which is moved axially, in order to carry out my invention in its completeness means are provided for holding the stick upright and rotating it while the annular cutters are moved toward and from the stick-supporting means along the stick and coaxially thereof. By this means any danger of the cutters coming eccentric of the rotating stick is avoided, and the rotary motion of the stick tends to hold the stick true with relation to the cutters, so that any number of very thin pipes of great length may be cut truly and uniformly. It is possible with this invention to cut tubes of this character thirty feet or more in length, for the reason that I suspend and rotate the stick, allowing the lower end of the stick to be free, so that the force of gravity and the force of the inertia of the rotating stick adjust the stick with true relation to the vertically-moving cutters. A guide may be provided at the lower end of the stick, but is constructed to leave such lower end free to move within requisite limits.

It is necessary that all of the cutters be held concentric with the axes of the proposed tubes and cylinder to be cut, and this is accomplished by three features of my invention: First, I provide an arrangement of screw-adjusted wedges for positioning and holding the lower ends of the cutter-supports; second, I provide holes near the upper ends of the cutter-supports through which bars can be inserted at right angles to each other through the cutter-supports from side to side; third, I rotate the stick and hold the cutters from rotating.

My invention includes the machine and the combinations and parts herein described and claimed.

The accompanying drawings illustrate my invention.

Figure I is a front elevation of a machine embodying my invention. A log or stick of timber is shown in position to be cut into tubes or pipes. Fig. II is a plan section on line II II, Fig. I. Fig. III is a plan on a larger scale on line III III, Fig. I. Fig. IV is an enlarged fragmental view of the clamp to be fastened to the upper end of the stick for supporting and rotating the same in the operation of making the pipe. Fig. V is a detail view on the same scale as Fig. IV, showing the clutch and the mechanism for connecting the same with the rotary shaft which receives the power to turn the stick. A portion of the rotary shaft is shown, and a portion of the supporting-frame is shown in vertical longitudinal mid-section. The means for operating the catch for holding the clutch in the frame is detailed in this view. The clutch is turned a quarter-way round from the position shown in Fig. I. Fig. VI is a detached view of the rotary shaft which drives the clutch shown in Figs. IV and V. Fig. VII is a view looking up from line VII, Fig. I, showing the means for holding the clutch on the frame in position to be rotated by the shaft shown in Fig. VI. Fig. VIII is an elevation viewed from line VIII, Fig. I. Fig. IX is a fragmental detail of the lower end of the cutter-support. Line IX, Fig. I, indicates the plane from which the view is taken. Fig. X is a vertical sectional elevation on line X, Fig. I. Fig. XI is a fragmental detail illustrating the preferred means for centering and holding the cutter-supports. Fragments of two supports are shown. Fig. XII is a section on line XII, Fig. XI. Fig. XIII is a section on line XIII, Fig. XI. Fig. XIV indicates a preferred form of latch-ring or guide-ring for holding and guiding the lower end of the stick in the process of turning.

1 indicates the frame of the machine, which stands upright and is more than twice the length of the stick to be cut.

2 indicates an annular cutter having a vertical axis. In practice said cutter is formed of one or more cutter members $a$, concentrically arranged and simultaneously used. The number of cutter members depends upon the work to be performed. It is to be understood that where only one cutter member is used the product would be an internal cylindrical core and an external tube having the external form of the stick from which it is cut and having an internal cylindrical bore. In the form shown three concentric cutter members $a$ are shown arranged in a gang or nest.

3 indicates a chuck constituting means for suspending the stick 4 axially upright above said cutters. Preferably the cutter members $a$ are fixed against rotation, being carried by a cross-head 5, sliding in a vertical way 6 on the frame.

7 indicates a vertical rotary shaft for rotating the chuck 3, which holds the stick 4.

8 indicates a windlass having sprocket-wheels 9, over which are trained sprocket-chains 10, which are fastened at one end to the cross-head 5.

11 indicates weights at the other end of the chains 10 to counterbalance the cross-head 5, together with the weight of the cutters 2. The weights 11 are adjustable by means of supplemental weights 12, which may be connected with or removed from the sprocket-chains 10 to overbalance to a greater or less degree the cross-head 5 and the parts sustained by it, thus to drive upward with a greater or less force the cutter or cutters carried by the cross-head. The rotary shaft 7 has an angular portion 13 to seat in an angular socket 14 in the stick holding and rotating chuck 3. Said chuck is furnished with an upwardly-projecting hub 15, furnished with an annular groove 16 to be caught by a slide 17 to detachably hold the chuck and allow it to rotate.

18 indicates a pulley through which power is applied to drive the shaft 7. The lower end of said shaft 7 is tapered, as indicated at 19, to form a center to seat in a seat 20 in the upper end of the log to be cut. The slide 17 detachably connects the chuck with the shaft by supporting it in position with the angular end of the shaft inserted in the angular socket of the chuck. Said slide is adapted to be moved back and forth to release and catch the hub 15. Preferably the toothed annular cutter members $a$ are supported by vertically-extending tubes 21. The shaft 7 runs in bearings 22 at the top of the frame, and its lower end is angular at 13 to seat in the seat 14 of the chuck 3 to rotate the chuck when it is held by the slide 17. The sliding catch 17 is moved back and forth by a lever 23.

24 indicates a rod for operating the lever. This rod 24 is shown in Fig. V, but is omitted from Fig. I to avoid confusion of lines.

25 indicates pulleys on the frame 1, over which ropes 26 are led and fastened to members 27 of the stick-chuck 3 for raising and lowering the same when the stick is fastened in the chuck.

28 indicates movable clamps preferably operated by suitable means, such as screws 29, to adjustably clamp the stick 4 in the chuck and to center the same in said chuck. The clamps 28, as shown, are preferably furnished with angular recesses 30 to fit upon the corners of a square stick of timber. The ropes 26 are furnished with hooks 31 to hook into gains 32 in the arms 27 of the chuck 3. The hooks 31 are sufficiently heavy to overbalance the hanging portion of the rope 26, so that when the ropes 26 are slackened the hooks will fall away from and become disengaged from the arms 27, thus leaving them free to rotate.

In practice to place the log or stick 4 in position for cutting the chuck will first be fastened to the log or stick by means of the screw-operated clamps 28, which are forced into the wood by screws 29, so as to uphold the stick. The hooks 31 will be caught in the gains 32, and by means of the ropes 26 the chuck will be drawn up into the position shown in Fig. I and will receive the angular end of the rotary shaft 7. The axis of the trunnion-arms 27 of the chuck is preferably below the level of the mouth of socket 14, so that the operator can readily vibrate the stick 4 and bring the socket to register with the end of the shaft to receive the same.

33 indicates a hinged guide-ring to receive the lower end of the log or stick 4, and 34 indicates a support for holding the guide-ring 33 in horizontal position and to allow it to be lowered to allow the lower end of the log to be swung into and out of the ring. Before the log is drawn up the lower end thereof will be trimmed, as at 35, to conform to the ring, so that when the log or stick 4 is suspended, as shown in the drawings, it will be ready to rotate on a vertical axis.

36 indicates the adjustable guides for the upper ends of the annular cutters in starting the same into the wood. The cutters are preferably provided with supports made of steel tubes 21, a tube for each of the cutter members, respectively, and said tubes 21 are preferably detachably supported on the cross-head 5. For this purpose the tubes are furnished at their lower ends with notches 37, which fit upon the members of the cross-head 5.

38 indicates hooks for detachably fastening the tubular cutter-supports 21 on the cross-head 5.

When the stick is rotated on a vertical axis and the cutters are forced upwardly, the sawdust cut by the cutters falls down and readily clears the kerfs, so that the kerfs are constantly free from any accumulation. The rotating stick rests largely on the cutter-teeth and not upon the bearing between the slide 17 and clutch-hub 15, thus at once increasing the speed of cutting and also avoiding wearing of the bearings.

It is to be understood that the latch-ring 33 may be made separable, as shown in Fig. XIV, and the front half $b$ will swing on the vertical pivot $c$ and will be held in place by the latch $d$. This form is preferred, for the reason that the main body $e$ of the latch-ring always remains concentric with the extended axis of the shaft 7.

The upper end of the socket 14 is preferably circular, as indicated in dotted lines in Fig. IV, so that the lower square end of the shaft 7 will readily enter the square portion of the socket 14.

40 indicates holes or seats ninety degrees apart in the cutter-supports, near the tops thereof, through which rods or bars 41 are thrust at right angles to each other before starting to cut a stick, thus to hold the cutters concentric at the time of starting. When the cutters are well started, the rods are withdrawn by the operator, thus to allow the cutter-supports to enter the kerfs fully as the cutting proceeds.

Various means may be provided for firmly holding the cutter-supports at the bottoms thereof. In Figs. XI, XII, and XIII I have illustrated a preferred appliance for this purpose. 42 indicates a wedge furnished with a nut 43, through which a screw 44 screws. 45 indicates a companion wedge, to which the screw 44 is swiveled at 46. 47 and 48 indicate guideways and runners slidably connecting the wedges together. The two wedges 42 and 45, with the nut and screw, constitute an expansible block. Four of these blocks are provided for each annular space, respectively, between the cutter-supports. The free end of screw 44 is shaped to be turned by a suitable instrument, such as a wrench, as indicated by the angular portion 49 shown in Figs. XI and XIII.

It is to be understood that I do not limit myself to any particular form of cutters. By "annular" cutters I mean cutters which are adapted to cut an annular kerf in a timber upon the rotation of the timber or upon rotation of the cutters.

The nut 43 of the wedge 42 is preferably carried by an arm 50 to give freedom of play for the slidable wedge 45 and to allow the expansible block to be appropriately inserted into the annular space between the cutter-supports.

What I claim, and desire to secure by Letters Patent of the United States, is—

1. A wood-pipe machine comprising an annular cutter having a vertical axis; rotary means for suspending and rotating a stick axially upright above said cutter; and means for moving the cutter up and down.

2. A wood-pipe machine comprising a plurality of coaxially annular cutters mounted respectively on upright supports which will enter the kerfs cut by their respective cutters; rotary means for suspending a stick axially above said cutters; and means for moving the cutters up and down.

3. The combination of a rotary clutch for suspending a stick; an annular cutter arranged axially below said clutch; and means for moving said cutter toward and from said clutch.

4. The combination of a plurality of annular cutters; means for supporting said cutters and moving them endwise; a shaft mounted above said cutters; means for rotating the shaft; means connected with said shaft to rotate therewith and constructed to suspend a stick above the cutters; and means for moving the cutters up and down.

5. The combination of an annular cutter; means for supporting said cutter and moving it endwise; a shaft mounted above said cutter; means for rotating the shaft; a clutch constructed to suspend a stick above the cutters; means for detachably connecting said clutch with said shaft to rotate therewith; and means for moving the cutters up and down.

6. The combination of a rotary clutch for suspending a stick; an annular cutter arranged axially below said clutch; and means for producing relative endwise movement between said cutter and clutch.

7. The combination of a plurality of annular cutters; means for moving said cutters axially up and down; and means for suspending and rotating a stick in the path of said cutters.

8. A wood-pipe machine comprising a vertical rotary shaft; a clutch constructed and arranged for clutching and suspending a stick detachably connected with said shaft to rotate therewith; means for raising and lowering the clutch; an annular guide for the lower end of the stick constructed and arranged to allow the stick to swing slightly; an annular cutter coaxial of the shaft and fixed against rotation; and means for moving said cutter up and down.

9. In a wood-pipe machine, the combination of means for suspending and rotating a stick on a vertical axis; one or more cutters mounted on a support to move up and down coaxially of said stick; and a counterbalance connected with the support to draw it upward.

10. In a wood-pipe machine, the combination of means for suspending and rotating a stick on a vertical axis; one or more cutters mounted on a support to move up and down coaxially of said stick; and an adjustable counterbalance connected with the support to draw it upward.

11. The combination with means for suspending and rotating a stick on a vertical axis; of one or more annular cutters; a support for said cutters; a vertical guide for said support; a shaft; sprocket-wheels on said shaft; sprocket-chains connected with said support and led over said sprocket-wheels; weights on said flexible connections to counterbalance the support; and means for rotating the shaft.

12. The combination of means for suspending and rotating a stick on a vertical axis; annular cutters arranged below said means coaxial therewith; means for raising and lowering said cutters; and guides for the upper end of the cutters.

13. A chuck for holding a stick; elevated means for rotating the chuck; detachable means for lifting the chuck to connect it with the rotating means; an annular cutter; and means for raising and lowering the annular cutter.

14. The combination of a vertical shaft having its lower end adapted to rotate a chuck; means for rotating the shaft; a stick-holding chuck furnished with a socket for said shaft and with members by which the chuck can be lifted; flexible connections detachably connected with said members to lift the chuck, the axis of said members being below the mouth of the socket into which the shaft is to seat.

15. The combination of the frame; pulleys on the frame; flexible connections led over said pulleys, respectively; a chuck furnished with a socket and with means for clamping a stick and with members for the attachment of said flexible connections; a vertical rotary shaft to seat in said socket to turn the chuck; an annular cutter; means for raising and lowering the cutter toward and from the chuck; and means for rotating the shaft above the cutter.

16. In a wood-pipe machine, the combination with a vertical rotary shaft; of a stick-clamping chuck furnished with a socket to fit said rotary shaft; an annular cutter; means for raising and lowering the cutter toward and from the chuck; means for supporting the stick and chuck with the shaft in said socket above the cutter, said chuck being furnished with supporting members; flexible connections furnished with hooks to hook upon said supporting members and weighted to become detached from said supporting members by the force of gravity, substantially as set forth.

17. The annular cutters; supports for said cutters furnished with seats for cross-bars; and cross-bars inserted in said seats to hold the cutters concentric in the act of starting the cut.

18. The combination of a plurality of annular cutters; supports for said cutters respectively; and expansible blocks for holding said supports in position relative to each other.

19. The combination with the cutter-supports; of two wedges slidably connected together between two of said supports; a nut on one of said wedges; and a screw swiveled to the other wedge and screwed through the nut.

20. The combination with the annular cutter-supports; of a wedge furnished with an arm and with a nut on said arm; another wedge slidably connected with the first-named wedge; a screw swiveled to said last-named wedge and screwed through the nut; said wedges being arranged between two supports to engage the same.

In testimony whereof I have signed my name to this specification, in the presence of two subscribing witnesses, at Burnett, in the county of Los Angeles, State of California, this 1st day of August, 1901.

ANDREW ANDERSON.

Witnesses:
  W. W. LOWE,
  E. W. ANDERSON.